US006452613B1

United States Patent
Lefebvre et al.

(10) Patent No.: US 6,452,613 B1
(45) Date of Patent: *Sep. 17, 2002

(54) SYSTEM AND METHOD FOR AN AUTOMATED SCORING TOOL FOR ASSESSING NEW TECHNOLOGIES

(75) Inventors: Christopher R. Lefebvre, Landenberg, PA (US); Stephen T. Schreiner, Alexandria, VA (US)

(73) Assignee: First USA Bank, N.A., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/517,062

(22) Filed: Mar. 1, 2000

(51) Int. Cl.[7] .................................................. G06F 3/14
(52) U.S. Cl. ........................ 345/733; 345/835; 345/764; 345/751; 345/810; 709/201; 709/203
(58) Field of Search ................................. 345/348, 329, 345/339, 331, 352, 975, 835, 733, 764, 751, 810, 809; 709/201, 217, 203; 705/35, 36, 10

(56) References Cited

U.S. PATENT DOCUMENTS

| | | | |
|---|---|---|---|
| 3,850,433 A | | 11/1974 | Purlia |
| 5,317,683 A | * | 5/1994 | Hager et al. ................. 345/330 |
| 5,473,732 A | * | 12/1995 | Chang ......................... 706/59 |
| 5,754,840 A | | 5/1998 | Rivette et al. |
| 5,796,395 A | * | 8/1998 | Hond ......................... 345/331 |
| 5,991,751 A | * | 11/1999 | Rivette et al. ................. 707/1 |
| 5,991,780 A | | 11/1999 | Rivette et al. |
| 5,999,907 A | | 12/1999 | Donner |
| 6,018,714 A | | 1/2000 | Risen, Jr. et al. |
| 6,049,811 A | * | 4/2000 | Petruzzi et al. ............. 707/507 |
| 6,112,181 A | * | 8/2000 | Shear et al. .................. 705/1 |
| 6,151,581 A | * | 11/2000 | Kraftson et al. ............... 705/3 |
| 6,189,029 B1 | * | 2/2001 | Fuerst ........................ 709/217 |

OTHER PUBLICATIONS

PCT–International Search Report dtd Jun. 13, 2001 (2 pages).

* cited by examiner

Primary Examiner—Kristine Kincaid
Assistant Examiner—Thomas T. Nguyen
(74) Attorney, Agent, or Firm—Hunton & Williams; Stephen T. Schreiner, Esq.

(57) ABSTRACT

The invention comprises an apparatus and method for an automated invention submission and scoring tool for evaluating invention submissions. The system comprises a server system and a plurality of server systems. The server system presents submission questionnaires over a networked connection to submitters at user systems. The user completes the questionnaires, which are returned to the server system for processing. The server system processes the answers to provide a quantified evaluation of the submission based on patentability and at least one other parameter, such as impact or value. An evaluator at an evaluator system can view a presentation of the quantified assessment of the invention submission. The evaluator can also view the results of multiple invention submissions on a status overview page. Links between the status overview page, individual questionnaires, and individual assessment presentations are provided.

22 Claims, 4 Drawing Sheets

SCORING TOOL STATUS PAGE

| SCORE | INVENTION NAME | SUBMITTER | DATE OF SUBMISSION | INVENTOR NAMES | STATUS | OTHER |
|---|---|---|---|---|---|---|
| 95 / 90 | | J. SMITH | 2 / 2 / 2000 | | | |
| 92 / 85 | | C. JOHNSON | 6 / 9 / 1999 | | | |
| 86 / 80 | | K. HART | 4 / 7 / 1999 | | | |
| 70 / 68 | | C. LEFEBVRE | 1 / 17 / 2000 | | | |
| 40 / 72 | | S. SCOTT | 8 / 6 / 1999 | | | |
| 50 / 61 | | R. TYLER | 10 / 2 / 1999 | | | |

FIG. 4

SYSTEM AND METHOD FOR AN AUTOMATED SCORING TOOL FOR ASSESSING NEW TECHNOLOGIES

FIELD OF THE INVENTION

The present invention relates generally to a system and method for allowing an organization to evaluate new technologies.

BACKGROUND OF THE INVENTION

In this so-called "Information Age," businesses must stay technologically current in order to continue to compete effectively. This is the case when the line of business involves the provision of technology-related products and services. For example, a company may manufacture products, such as hardware, software, or consumer electronics. Or a company may render technology-related services, such as Y2K remediation or Internet-related services, such as e-Bay™ or Priceline™. For all such companies, the continued development and improvement of the technology-based product or service is prerequisite to success. This is because their product is technology.

Even concerns not traditionally considered to be "technology companies" heavily rely on technology in the Information Age. For example, so-called "brick and mortar" retailers are increasingly venturing into the virtual marketplace of the Internet to peddle their wares. Most new companies set up web sites on the World Wide Web to generate good will and provide customers a mechanism to contact them. Airlines issue electronic tickets and permit reservations to be made "on line." Consumers can buy gas using special transponders that do not need to be "swiped" or handed to an attendant. Commuters can use their farecards in subways without having to physically pass them through a reader.

In the financial industry, businesses such as banks and credit card issuers permit users to access accounts over the Internet. Users can access accounts using automated systems accessed via the keypad on the telephone and interactive voice response (IVR) units. Users can apply for loans over the Internet without having to visit a bank or wait days or even weeks for loan processing. Automated call routing systems route customer inquiries to specialized personnel at call centers dispersed across the country. Deposits and transfers of funds can be effectuated remotely without having to visit the local branch or sending paper instruments.

The aforementioned are but a few examples intended to illustrate the important role that technology development has to the bottom line for the modern enterprise. The other side to technology development is technology protection. An enterprise gets the full benefits of its investment in technology development by preventing others from simply copying inventions.

As a result, businesses are increasingly relying on intellectual property law, particularly the patent law, to protect these intangible business assets. As is well known, the patent law sets forth very specific and demanding requirements that must be satisfied before protection is afforded. Moreover, the expenses for preparing and filing patent applications can be substantial. Therefore, businesses tend to carefully consider these legal and cost issues before seeking patent protection for new technologies. The process of evaluating these issues for invention submissions tends to be laborious and largely manual, a significant drawback.

Moreover, as enterprises place a greater emphasis on seeking patent protection, they may have difficulty in dealing with the sheer volume of submissions from erstwhile inventors. Paradoxically, perhaps, as management educates employees to recognize and submit new technologies in order to protect the company, management can become quickly overwhelmed. In short, there is no mechanism for efficiently assessing and prioritizing submissions. This is a significant drawback.

Other problems and drawbacks also exist with traditional approaches to evaluating invention submissions.

SUMMARY OF THE INVENTION

What is desired is a system and method for enabling an organization to evaluate invention submissions in an automated fashion that provides a quantified assessment.

Another object is to provide a system and method for enabling an organization to evaluate invention submissions based on a quantified assessment that considers both patentability and value to the organization.

Another object is to provide a system and method for enabling individuals in an organization to submit inventions for consideration using a Graphical User Interface (GUI) based system with objective questions, such as multiple choice, true/false or yes/no type questions.

Another object is to provide a system and method for enabling individuals submitting an invention for consideration using a GUI-based questionnaire easily completed and submitted, so as to thereby reduce the time required for submission.

Yet another object is to provide a system and method for providing a GUI-based presentation of a quantified assessment of an invention submission that is easily evaluated by an evaluating party.

Yet another object of the invention is to provide an objective-type questionnaire for invention submissions that is evaluated using a scoring tool that weights questions based on patentability and at least one other metric, such as value or impact.

Yet another object of the invention is to provide a scoring tool that presents a prioritized presentation of invention submissions based on a quantified assessment to thereby make evaluation by the evaluating party more efficient.

To achieve these and other objects of the present invention, and in accordance with the purpose of the invention, as embodied and broadly described, an embodiment of the present invention comprises an apparatus and method for an automated invention submission and scoring tool for evaluating invention submissions. The system comprises a server system and a plurality of server systems. The server system presents submission questionnaires over a networked connection to submitters at user systems. The user completes the questionnaires, which are returned to the server system for processing. The server system processes the answers to provide a quantified evaluation of the submission based on patentability and at least one other parameter, such as impact or value. An evaluator at an evaluator system can view a presentation of the quantified assessment of the invention submission. The evaluator can also view the results of multiple invention submissions on a status overview page. Links between the status overview page, individual questionnaires, and individual assessment presentations are provided.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which:

FIG. 4 provides an exemplary graphical user interface presenting a status overview page of the results of processing multiple invention submissions.

DETAILED DESCRIPTION OF THE INVENTION

As discussed in the Summary of the Invention, the present invention is directed to an automated computer-based system for evaluating invention submissions.

Overview of the System According to One Embodiment

Figure 1:
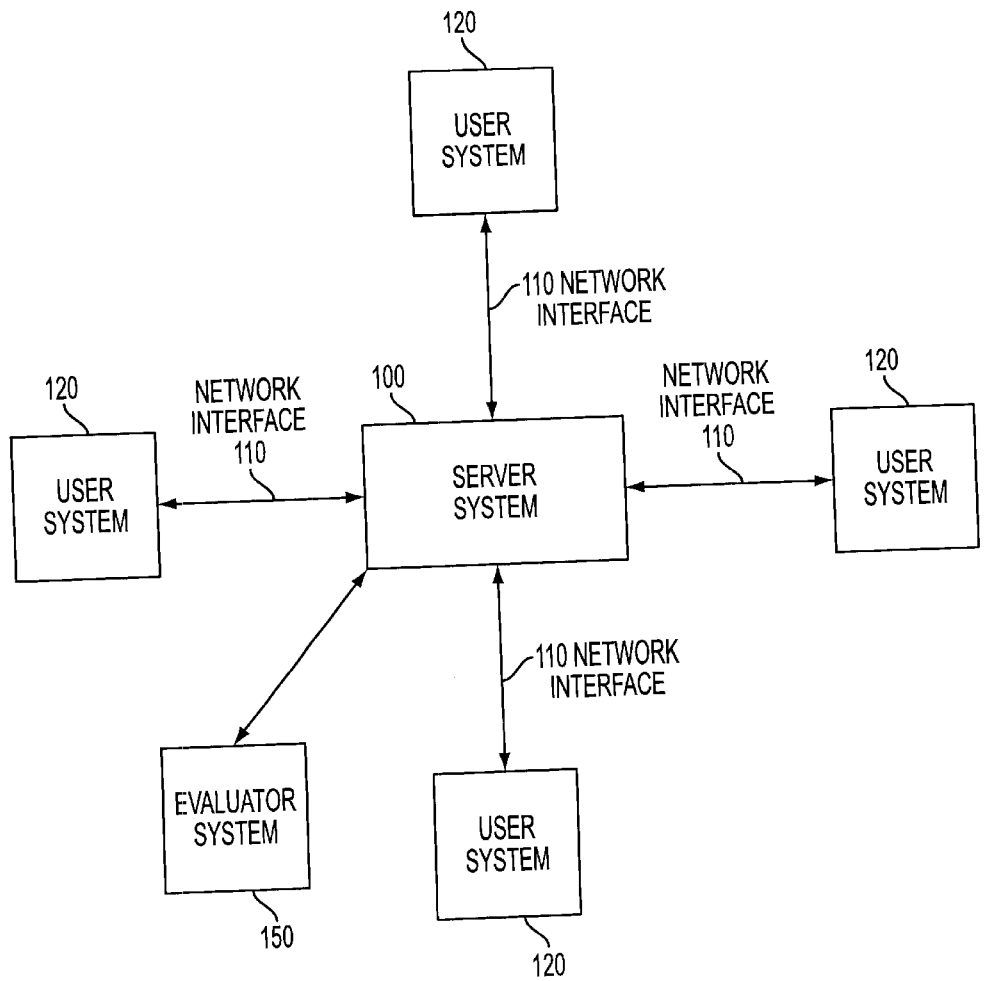
FIG. 1 is a block diagram illustrating the scoring tool system, including a server system, user systems, evaluator system and network interface.

FIG. 1 illustrates an exemplary system for the invention according to one embodiment, comprising a server system 100, user systems 120, evaluator system 150 and network interface 110.

Network interface 110 may comprise any networked-interface, such as a company Intranet, the Internet, World Wide Web, direct dial connection via modem or other communication means, Internet Protocol next generation (IPng), and any other means for computer systems to communicate with server system 100. It should be appreciated that the configuration of network interface may be different for different computer systems. That is, a first user system 120 may be communicating with server system 100 over a company Intranet, whereas a second user system 120 may be communicating over the Internet. In the preferred embodiment network interface 110 will comprise an Intranet-type interface with firewall and password protection to protect confidential information.

User systems 120 comprise any computer system capable of interfacing with server system 100 to send and receive data. Accordingly, user systems 120 may comprise personal computers, microcomputers, minicomputers, personal data devices, palm pilot-type devices, and any other existing or next generation devices enabling client-server interaction. Generally, user systems 120 refer to those systems used by individuals completing questionnaires to submit new technologies to the scoring tool of the present invention.

Evaluator system 150 refers to one or more systems used by evaluators who evaluate the results of the processing by the scoring tool of the instant invention. Evaluator system 150 may comprise any of the computer technologies discussed above regarding user systems 120.

In one embodiment, user systems 120 and evaluator system 150 comprise personal computers using a Microsoft Windows™ operating system and a Netscape™ or Microsoft Explorer™ web browser.

Server system 100 is a server system for interfacing with multiple user systems 120 and evaluator systems 150. Server system 100 may include any front end web processing software for interfacing with user systems 120 and evaluator system 150. Server system 100 may also include the scoring tool software logic for processing questionnaires submitted by users to computed the quantified results. Server system 100 may also include the software for generating the Graphical User Interface (GUI) presentations of said results. The ordinary artisan will appreciate that server system 100 may comprise a single server system or, alternatively, multiple systems across a distributed architecture.

Server system 100 comprises processing modules for processing the questionnaires completed by invention submitters. For example, server system 100 may comprise a questionnaire processing module for totaling the score for questionnaires. Server system 100 may comprise a questionnaire presentation processing module for generating graphical presentations of the processed results. Server system 100 may also comprise various storage modules for storing data associated with the instant scoring tool invention. For example, there may be a raw data memory module storing the individual questionnaire data. There may be a processed data memory module storing the results of the scoring for individual submissions. There may be a separate memory module for storing the results of multiple submissions.

Of course, the implementation and allocation of such processing and data storage functions may take many forms. The creation of the necessary processing logic and data storage elements is well within the skill of the ordinary artisan.

Overview of a Method According to One Embodiment

Figure 2:
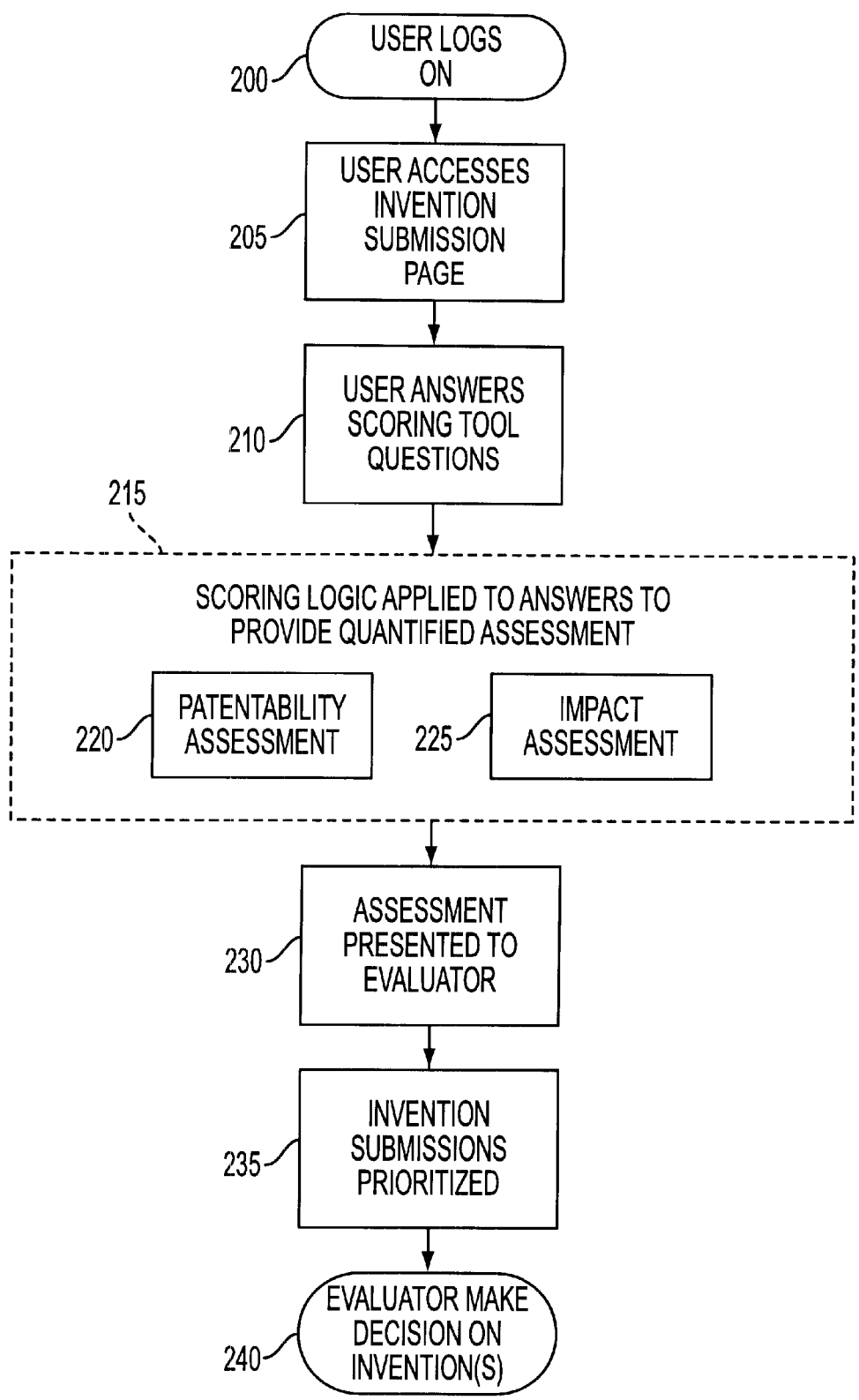
FIG. 2 is a block diagram according to an embodiment of the invention for a method for a user to submit an invention for automated processing and presentation to an evaluating party.

FIG. 2 presents an overview of a method for employing the automated scoring tool of the present invention. A user logs on, as in 200, and accesses an invention submission page, as in 205. In the preferred embodiment, an invention submission page is stored by server system 100 and presented via web browser interface. The submitting user answers a series of questions to be processed by the scoring tool, as in 210. The data entered by the user is then sent to server system 100.

Scoring logic is applied by the scoring tool to provided a quantified assessment of the invention, as in 215. In the preferred embodiment discussed further herein, the scoring tool performs a patentability assessment, as in 220, and an impact assessment, as in 225. Of course, other metrics or criteria could be used in addition or in the place of the impact criteria. Generally, the patentability assessment provides a result quantifying patentability. Likewise, the impact assessment provides a result quantifying the potential impact or value that securing a patent might provide for the business.

The quantified result of the assessment is presented to an evaluator, as in 230. The evaluator generally describes an individual responsible for making a decision regarding whether to proceed with a patent application. Of course, there may be several such individuals. The presentation of the quantified results may take many forms. The presentation could simply be a numerical result. In the preferred embodiment, a presentation in the form of a graph is presented, as further discussed regarding FIG. 3.

Based on quantified results for various submissions, an evaluator can prioritize the submissions, as in 235, to efficiently allocate company resources. At step 240, the evaluator may make decisions on the invention or inventions that have been submitted.

An Exemplary Invention Submission Questionnaire

In one embodiment, twenty questions are presented to the submitter. The questions are generally directed to the metrics of patentability and impact. As expected, many questions pertain to both metrics. As a result, each question is scored for both metrics, so that a question pertaining to both patentability and impact can contribute to both scores. A question pertaining to patentability only contributes a value of zero to impact.

In the preferred embodiment the questionnaire is prepared by identifying a series of questions designed to garner information pertaining to the metrics at issue, here, patentability and impact. Once a series of questions is identified, the logic for the scoring tool is created as follows. All questions pertaining to each metric are identified. For example, all questions pertaining to patentability are identified, and all pertaining to impact are identified. There will be overlap, of course, because some questions pertain to both metrics. In the series of questions discussed below, ten questions were relevant to patentability and thirteen questions were relevant to impact.

Then for each group, the questions are rank ordered according to their perceived importance to that metric. Based on that rank ordering, questions are scored in a weighted fashion. For example, the patentability question of rank order 1 can contribute more to the patentability score than the patentability question of rank order 10. In the preferred embodiment, the scoring is designed to yield a total maximum score of 100 for each metric.

In one embodiment, a series of twenty questions are prepared according to three focus categories: (1) whether the technology is "New & Unique;" (2) whether the technology renders an "Efficiency Gain and/or Capability Improvement;" and (3) what is the nature of the "Technology." Once questions and answers are prepared, each question was ranked and scored for patentability and impact, as previously described. In this embodiment, the following questions and scoring criteria were developed:

1) Is your innovation currently known or used by anyone outside the company?
    ○ A. Yes     ○ B. No
Answer Scoring:
  PatentabilityPoints     ImpactPotentialPoints
  A. 0     A. 0
  B. 16     B. 0
2) Have you heard others discuss the basic concept of your innovation?
    ○ A. I've heard the concept discussed inside the company
    ○ B. I've heard the basic concept discussed outside the company and my innovation is similar/same as that concept
    ○ C. I've heard the basic concept discussed outside the company, but my innovation includes enhancements to that concept
    ○ D. I've never heard it discussed
Answer Scoring:
  PatentabilityPoints     ImpactPotentialPoints
  A. 13     A. 0
  B. 0     B. 0
  C. 10     C. 0
  D. 15     D. 0
3) How would you best describe the nature of your innovation?
    ○ A. The innovation is a completely new idea
    ○ B. The innovation is a unique way to implement an existing idea
Answer Scoring:
  PatentabilityPoints     ImpactPotentialPoints
  A. 11     A. 10
  B. 8     B. 6
4) Do you believe your innovation solves a long-felt problem or on-going need in the industry?
    ○ A. Yes     ○ B. No
Answer Scoring:
  PatentabilityPoints     ImpactPotentialPoints
  A. 9     A. 9
  B. 3     B. 2
5) What is the level of likelihood that your innovation could be adopted as a standard by your competition or industry?
    ○ A. Strong likelihood
    ○ B. It's possible
    ○ C. Not likely
Answer Scoring:
  PatentabilityPoints     ImpactPotentialPoints
  A. 0     A. 13
  B. 0     B. 7
  C. 0     C. 2
6) If your innovation is based on a "platform" (e.g., hardware or software package) created by somebody else, have you modified, programmed or implemented the platform, so as to provide unique enhancements?
    ○ A. Yes     ○ B. No
Answer Scoring:
  PatentabilityPoints     ImpactPotentialPoints
  A. 6     A. 0
  B. 0     B. 0
7) If you are aware that others have tried to address the same problem as your innovation, how similar was their approach?
    ○ A. No one has previously tried to address the same opportunity
    ○ B. The approaches others have taken are very different from mine.
    ○ C. The approaches others have taken are similar, but not the same as mine
    ○ D. The approaches others have taken are the same as mine, but were not implemented.
Answer Scoring:
  PatentabilityPoints     ImpactPotentialPoints
  A. 14     A. 0
  B. 10     B. 0
  C. 7     C. 0
  D. 3     D. 0
8) How was the idea for your innovation generated and developed?
    ○ A. I thought it up solely on my own.
    ○ B. Brainstromed with my peers or involved others.
    ○ C. The idea was given to me by someone else and I implemented it.
Answer Scoring:
  PatentabilityPoints     ImpactPotentialPoints
  A. 4     A. 0
  B. 4     B. 0
  C. 2     C. 0
9) This innovation will primarily result in:
    ○ A. Reduced Cost
    ○ B. Increase Revenue
    ○ C. Improved Marketing/Image/Prestige
    ○ D. Employee or Customer Satisfaction
    ○ E. 2 or more of selections A through D
    ○ F. No measurable impact
Answer Scoring:
  PatentabilityPoints     ImpactPotentialPoints
  A. 0     A. 9
  B. 0     B. 7
  C. 0     C. 4

-continued

| | |
|---|---|
| D. 0 | D. 5 |
| E. 0 | E. 11 |
| F. 0 | F. 0 |

10) This innovation will primarily:
    ○ A. Improve an existing company capability
    ○ B. Provide a new capability
    ○ C. Provides for continued operation.
Answer Scoring:

| PatentabilityPoints | ImpactPotentialPoints |
|---|---|
| A. 0 | A. 5 |
| B. 0 | B. 8 |
| C. 0 | C. 2 |

11) This innovation will impact or be used by:
    ○ A. Our department or functional area.
    ○ B. An entire organization or line of business.
    ○ C. The entire company
    ○ D. Customers and/or Partners.
Answer Scoring:

| PatentabilityPoints | ImpactPotentialPoints |
|---|---|
| A. 0 | A. 2 |
| B. 0 | B. 3 |
| C. 0 | C. 4 |
| D. 0 | D. 6 |

12) What is the likelihood that the innovation would find application and/or be marketable outside the company?
    ○ A. Strong Likelihood
    ○ B. It is possible
    ○ C. Not likely
Answer Scoring:

| PatentabilityPoints | ImpactPotentialPoints |
|---|---|
| A. 0 | A. 14 |
| B. 0 | B. 9 |
| C. 0 | C. 3 |

13) Assuming the innovation has benefits, how would you rate the magnitude of the benefits?
    ○ A. Significant
    ○ B. Moderate
    ○ C. Slight
Answer Scoring:

| PatentabilityPoints | ImpactPotentialPoints |
|---|---|
| A. 0 | A. 3 |
| B. 0 | B. 2 |
| C. 0 | C. 0 |

14) How would you characterize your innovation in terms of its related technology?
    ○ A. The innovation constitutes new technology.
    ○ B. The innovation is an improvement or enhancement to existing technology
    ○ C. The innovation is a different use or application of existing technology
Answer Scoring:

| PatentabilityPoints | ImpactPotentialPoints |
|---|---|
| A. 12 | A. 4 |
| B. 9 | B. 3 |
| C. 8 | C. 2 |

15) Into which category would you say the innovation best fits?
    ○ A. Hardware
    ○ B. Software
    ○ C. Application/Usage
    ○ D. Network
    ○ E. Method/Process
Answer Scoring: (This question is for application information purposes only and will receive 0 pts for all responses)

| PatentabilityPoints | ImpactPotentialPoints |
|---|---|
| A. 0 | A. 0 |
| B. 0 | B. 0 |
| C. 0 | C. 0 |
| D. 0 | D. 0 |
| E. 0 | E. 0 |

16) Who was or would be involved in the development of the innovation
    ○ A. Employees
    ○ B. Contractors/Consultants/System Integrators
    ○ C. Developed external to the company. Individuals not under contract with the company
    ○ D. Joint Partnership with outside company or vendor
    ○ E. Combination of 2 or more of the above.
Answer Scoring:

| PatentabilityPoints | ImpactPotentialPoints |
|---|---|
| A. 8 | A. 1 |
| B. 6 | B. 1 |
| C. 0 | C. 0 |
| D. 3 | D. 0 |
| E. 5 | E. 1 |

17) What is the current status of the innovation?
    ○ A. Under design
    ○ B. Under development
    ○ C. In testing or prototype
    ○ D. In deployment
    ○ B. In usage
Answer Scoring:

| PatentabilityPoints | ImpactPotentialPoints |
|---|---|
| A. 5 | A. 0 |
| B. 5 | B. 0 |
| C. 4 | C. 0 |
| D. 2 | D. 0 |
| E. 1 | E. 0 |

18) In what way, if any, is your innovation related to the Internet?
    ○ A. The innovation is Internet based and would be primarily implemented via the Internet.
    ○ B. The innovation could be used in conjunction with the Internet, but does not have to be.
    ○ C. It is unlikely that the innovation would be used in conjunction with the Internet.
Answer Scoring:

| PatentabilityPoints | ImpactPotentialPoints |
|---|---|
| A. 0 | A. 2 |
| B. 0 | B. 1 |
| C. 0 | C. 0 |

19) Through what channel does your innovation "touch" the customer?
    ○ A. Direct Mail
    ○ B. Live voice/Telephony
    ○ C. Internet/Automation
    ○ D. Live touch/In person
    ○ E. Advertising/Marketing/Indirect
    ○ F. 2 or more of the above
    ○ G. Innovation is internal in nature and does not touch our customer
Answer Scoring:

| PatentabilityPoints | ImpactPotentialPoints |
|---|---|
| A. 0 | A. 3 |
| B. 0 | B. 4 |
| C. 0 | C. 6 |
| D. 0 | D. 2 |
| E. 0 | E. 5 |
| F. 0 | F. 7 |
| G. 0 | 6. 1 |

20) What would you say the industrial scope of your innovations is?
    ○ A. It is specific to my company's line of business.
    ○ B. It is specific to my company's industry.
    ○ C. It has application beyond my company's industry.
Answer Scoring:

| PatentabilityPoints | ImpactPotentialPoints |
|---|---|
| A. 0 | A. 3 |
| B. 0 | B. 8 |
| C. 0 | C. 12 |

It is readily appreciated that the above questions and their scoring is exemplary only. Different metrics could be employed instead of "patentability" and "impact." Different questions could be employed, as well as different scoring. A key aspect to the invention is the use of predefined, objective type questions to speed up the invention submittal process. Not only is the submission process made more efficient for submitters, but the evaluation process is rendered more efficient by using a uniform set of inquiries.

Also, the application of the scoring tool to provide a quantified evaluation of submissions provides an automated and efficient means to evaluate and prioritize. In the preferred embodiment, the scoring tool logic is embedded and transparent to submitters, and the questions are shuffled. The increases the likelihood of fair responses.

Another noteworthy aspect of the invention is the use of some questions as so-called "information questions." For example, in the example disclosed above, question 15 is such a question. The question is included not for scoring, but to provide certain information to the evaluator. In this case, the question relates to the nature of the invention. Ultimately, even scored questions function as information questions because they may be qualitatively assessed by the evaluator. A questionnaire meeting a given scoring threshold may then be personally reviewed by the evaluator. The evaluator will review the various answers in order to develop a qualitative understanding of the nature of the invention. In this sense, the set of questions performs a dual role: (1) facilitating the automated scoring of submissions, and (2) conveying information about the invention to the evaluator in an orderly and uniform fashion.

An Exemplary Presentation of the Results of Processing by the Scoring Tool

Figure 3:
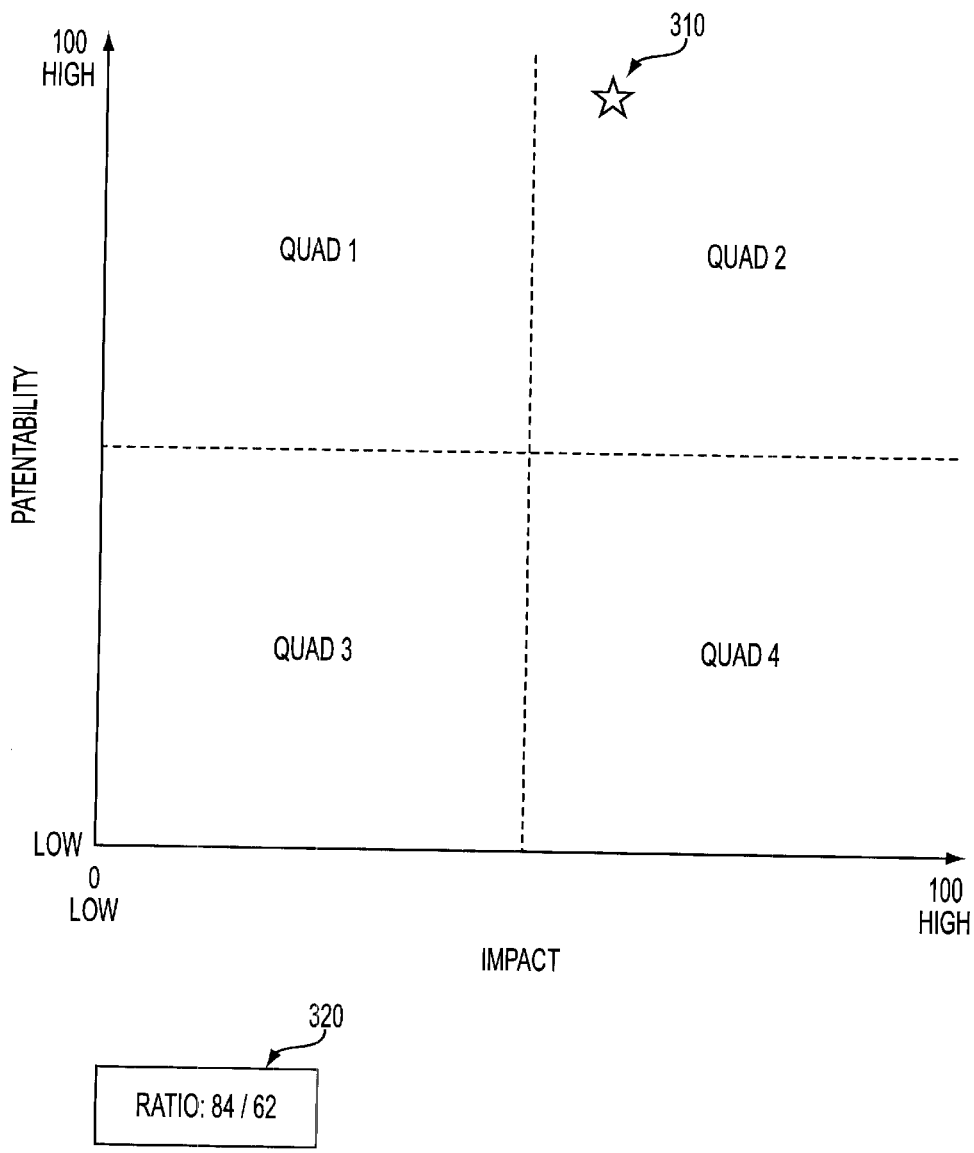
FIG. 3 provides an exemplary graphical user interface presenting a quantified assessment of an invention submission.

FIG. 3 illustrates an exemplary graphical presentation of the results of processing by the scoring tool for an individual submission. For a two-metric scoring tool, e.g., patentability and impact, a two-dimensional graph is especially convenient. As illustrated by FIG. 3, the x-axis charts impact ranging from low (0) to high (100). The y-axis charts patentability from low (0) to high (100). Four quadrants result from this display. Quadrant 1 generally defines highly patentable submissions that have low potential impact. Quadrant 4 defines high potential impact, but low patentability. Quadrant 3 defines submissions that score low for both metrics. Finally, quadrant 2 defines the most attractive submissions, i.e., those that are highly patentable and which have high potential impact.

The score for a given submission is presented in the proper location as marker 310, as illustrated in FIG. 3.

The presentation of FIG. 3 may also include a display of the numerical results 320 which correspond to the plot.

Links may also be provided in the graph of FIG. 3. In the preferred embodiment, the evaluator can click on the graph in order to link to the underlying questionnaire data.

An Exemplary Status Overview of Results of Multiple Submissions

FIG. 4 presented an exemplary GUI page 400 presenting the results of multiple submissions processed by the scoring tool. GUI page 400 may comprise headings, such as score 405, invention name 410, submitter 415, date of submission 420, inventor names 425, status 430 and other data 435. GUI page 400 provides a convenient means for the evaluator to review the various submissions in the queue. Links may be provided so that the evaluator can click on a given row to view a graph, such as that of FIG. 3, or the underlying questionnaire data.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A system for providing an automated assessment of an invention submission, comprising:
    a user system for providing responses to a series of inquiries regarding the invention submission, wherein the series comprises questions for which there exist selectable responses; and
    a server system for processing said responses to provide a quantified assessment of said invention submission, wherein the quantified assessment is based on scoring at least some of the responses by assigning weighted values based on said responses, and wherein the server system is further adapted to combine said weighted values to present at least one composite score, wherein the at least one composite score represents an indicia of the likelihood of receiving a patent and an indicia of at least one other metric;
    wherein said at least one composite score represents an indicia of the value that would be conferred by receiving a patent, the value comprising said at least one other metric;
    wherein said quantified assessment is prepared before a patent application exists for the invention submission; and
    whereby said quantified assessment is usable for determining whether a patent application should be prepared.

2. The system of claim 1, wherein said questions comprise at least one of multiple choice, true/false, and yes/no queries.

3. The system of claim 1, wherein the series of inquiries are presented as one or more graphical user interface pages by said server.

4. The system of claim 1, wherein said quantified assessment is used by the server system to create a graphical presentation of the results of said processing.

5. The system of claim 1, wherein said server system is adapted to present the results of a plurality of quantified assessments to enable a decision about said plurality by an evaluator.

6. The system of claim 5, wherein said results of a plurality of quantified assessments are presented on a graphical user interface page.

7. The system of claim 6, wherein a user can link from said page to view data associated with a single one of said plurality of quantified assessments.

8. A method for automatically evaluating an invention submission, comprising.
    accessing a server system maintaining a standard set of queries;
    viewing said queries on a user system, wherein the queries have selectable responses;
    providing responses to said queries;
    processing said responses; and
    generating an objective assessment of said submission at said server system based on said step of processing, wherein said objective assessment is prepared before a patent application exists for the invention submission, wherein the objective assessment is based on scoring at least some of the responses and is usable for determining whether a patent application should be prepared,
    wherein said objective assessment is computed by assigning weighted values based on said responses and combining said weighted values to present at least one composite score, wherein the at least one composite score represents an indicia of the likelihood of receiving a patent and an indicia of at least one other metric; and
    wherein said at least one composite score represents an indicia of the value that would be conferred by receiving a patent, the value comprising said at least one other metric.

9. The method of claim 8, wherein said standard set of queries are presented as a browser page.

10. The method of claim 8, further comprising the step of presenting a graphical representation of the results of said objective assessment.

11. The method of claim 10, wherein said graphical representation includes the results for a plurality of submissions.

12. The method of claim 8, further comprising the step of approving the preparation of a patent application based at least in part on said objective assessment.

13. The method of claim 8, wherein said queries comprise at least one of: multiple choice questions, true/false questions, and yes/no questions.

14. A method for automatically evaluating an invention submission, comprising:

selecting at least two metrics for evaluating the invention submission, a first of the metrics relating to patentability and a second of the metrics relating to another factor of interest;

identifying a plurality of questions for evaluating the invention submission, wherein the questions have selectable responses that are provided by a user system and from which a quantified assessment can be computed by a server system; and assigning scores to the questions for the metrics such that at least some questions are capable of contributing to the first metric, and at least some questions are capable of contributing to the second metric, and at least some questions are capable of contributing to the at least two metrics, wherein the quantified assessment is prepared before a patent application exists for the invention submission and the quantified assessment is used for determining whether a patent application should be prepared, and wherein the quantified assessment is computed by assigning weighted values based on responses to the questions and combining said weighted values to present at least one composite score, wherein the at least one composite score represents an indicia of the first metric and an indicia of the second metric; and wherein the second metric relates to the potential value or impact of securing a patent.

15. The method of claim 14, wherein the plurality of questions further comprises at least one informational question.

16. The method of claim 14, wherein the step of assigning scores is effectuated in a rank-order fashion so that different questions may have different maximum values that can be contributed to an overall score.

17. The method of claim 14, wherein the step of assigning scores is effectuated so that a maximum value of one hundred (100) is attainable for each of the metrics.

18. A system for automatically assessing an invention submission, comprising:

means for presenting to a user system a series of questions with selectable responses;

means for processing the responses to provide a quantified assessment of The invention submission, wherein the quantified assessment is based on scoring at least some of the responses by assigning weighted values based on said responses and combining said weighted values to present at least one composite score, wherein the at least one composite score represents an indicia of the likelihood of receiving a patent and an indicia of at least one other metric, wherein the means for processing includes a server system;

wherein said at least one composite score represents an indicia of the value that would be conferred by receiving a patent, the value comprising said at least one other metric;

wherein the quantified assessment is prepared before a patent application exists for the invention submission, and wherein the quantified assessment is usable to determine whether to prepare a patent application.

19. The system of claim 18, further comprising means for providing a graphical presentation of the quantified assessment, wherein the graphical presentation presents the quantified assessment according to patentability and the at least one other metric.

20. The system of claim 19, wherein the graphical presentation includes a link to the underlying response data.

21. The system of claim 18, further comprising means for providing a graphical presentation of a plurality of quantified assessments for purposes of evaluating a plurality of invention submissions.

22. A computer memory for storing a computer program operative to perform the following steps for automatically evaluating an invention submission:

presenting a series of questions having selectable responses that are provided by a user system regarding the invention submission;

processing the responses at a server system to provide a quantified assessment of the invention submission, wherein the quantified assessment is based on scoring at least some of the responses by assigning weighted values based on said responses and combining said weighted values to present at least one composite score, wherein the at least one composite score represents an indicia of the likelihood of receiving a patent and an indicia of at least one other metric;

wherein said at least one composite score represents an indicia of the value that would be conferred by receiving a patent, the value comprising said at least one other metric;

wherein the quantified assessment is prepared before a patent application exists for the invention submission, and wherein the quantified assessment is usable to determine whether to prepare a patent application.

* * * * *